United States Patent [19]

Miller

[11] 4,348,039
[45] Sep. 7, 1982

[54] RELEASE COUPLING
[75] Inventor: Jack E. Miller, Houston, Tex.
[73] Assignee: Big Inch Marine Systems, Inc., Houston, Tex.
[21] Appl. No.: 169,841
[22] Filed: Jul. 17, 1980
[51] Int. Cl.³ .............................................. F16L 55/00
[52] U.S. Cl. ........................................... 285/1; 285/95; 285/322; 285/DIG. 1
[58] Field of Search ............... 285/1, DIG. 1, 340, 285/322, 304, 95

[56] References Cited

U.S. PATENT DOCUMENTS

| | | | |
|---|---|---|---|
| 2,463,326 | 3/1949 | Smisko et al. | 285/1 X |
| 2,505,245 | 4/1950 | Hollerith | |
| 2,642,297 | 6/1953 | Hanna | |
| 2,671,512 | 3/1954 | Ragan et al. | |
| 3,097,865 | 7/1963 | Zeeb et al. | 285/1 |
| 3,201,147 | 8/1965 | De Cenzo | 285/1 |
| 3,520,331 | 7/1970 | Locke et al. | |
| 3,567,255 | 3/1971 | Evans | 285/1 |
| 3,776,578 | 12/1973 | Jessup et al. | 285/94 |
| 3,889,985 | 6/1975 | Gartmann | 285/95 |
| 4,018,463 | 4/1977 | Campbell | 285/166 |
| 4,059,288 | 11/1977 | Mohr | 285/2 |
| 4,071,268 | 1/1978 | Halling et al. | 285/95 |
| 4,124,228 | 11/1978 | Morrison | 285/1 |

FOREIGN PATENT DOCUMENTS

| | | |
|---|---|---|
| 2317614 | 10/1974 | Fed. Rep. of Germany |
| 2303226 | 10/1976 | France |
| 2393219 | 2/1979 | France |
| 1534547 | 12/1978 | France |
| 371391 | 5/1973 | U.S.S.R. |

OTHER PUBLICATIONS

Hydrotech's Pressure-Balanced Safety Joint.

*Primary Examiner*—Thomas F. Callaghan
*Attorney, Agent, or Firm*—Arnold, White & Durkee

[57] ABSTRACT

A high pressure coupling for releasably coupling high pressure tubular elements in sealed relationship, the coupling comprising a first tubular member having a socket formation, a second tubular member having a spigot formation sealingly engaged with the socket formation in mating relationship therewith, one member having an annular recess and the other member having a radially directed annular bearing surface to cooperate with a locking sleeve, and a radially deformable locking sleeve positioned in the annular recess, the locking sleeve being located against radial deformation out of the recess by the bearing surface engaging with the bearing surface of the locking sleeve. The coupling further includes bias means operative between the tubular members to provide a predetermined bias force to restrain axial separation of the mated formations. The tubular members of the coupling are axially separable upon application of an axial separation force in excess of the predetermined bias force of the bias means for the bearing surface to disengage from the locking sleeve, and for the locking sleeve to be radially deformed out of the annular recess to release the member having the recess for the spigot formation to separate from the socket formation and permit automatic uncoupling of the coupling. The tubular members are further shaped to define an annular pressure balancing chamber which is in communication with the coupling bore.

30 Claims, 5 Drawing Figures

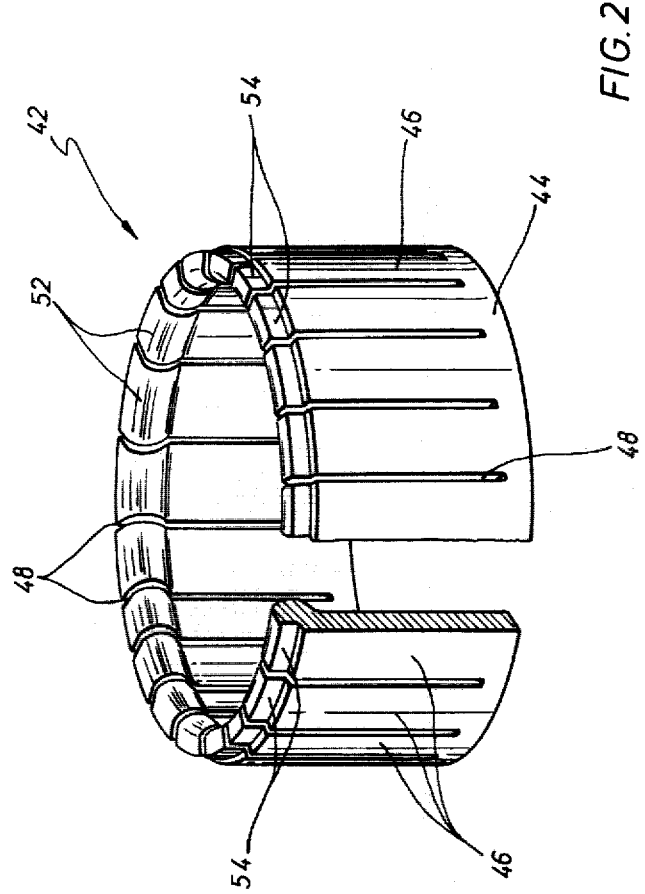

RELEASE COUPLING

This invention relates to a release coupling. More particularly, this invention relates to a high pressure release coupling for releasably coupling high pressure tubular elements for conveying fluids under high pressure, in sealed relationship, while allowing automatic uncoupling of the coupling in response to axial tension in excess of a predetermined amount.

In systems for conveying fluids at high pressure it is desirable, and often essential, that a release coupling be incorporated which can release automatically upon application of an axial tension in excess of a predetermined amount, to accommodate such tension and thereby prevent damage elsewhere in the system. This is particularly desirable in pipeline and other tubular element systems which are located in inaccessible or hazardous environments and/or which are connected to other apparatus units which would be difficult, expensive or inconvenient to repair in the event of damage.

Applicant is aware of pipe joints which have been designed to serve a similar function. These pipe joints do, however, present one or more of the following disadvantages:

(1) They are designed for use in relatively low pressure systems and cannot be adapted for use in high pressure systems;

(2) They do not and cannot provide a consistent release load which is unaffected by variations in internal pressure within the joint;

(3) They are of an extremely complicated construction utilizing numerous parts which require separate manufacture, making them unsuitable for use in high pressure systems and, in particular, precluding their use in large bore high pressure fluid conveying systems; and (4) They are incapable of simple and effective adjustment to provide for release at desired different axial tension loadings.

While the couplings of this invention may have application in regard to the coupling of various types of tubular elements, they can have particular application in regard to high pressure, large bore pipeline systems. They would therefore, for example, have particular application in regard to the coupling of tubular elements or pipeline sections in subsea environments, such as tubular elements or pipeline sections for use in conveying oil, gas or the like.

It is therefore an object of this invention to provide a high pressure coupling for releasably coupling high pressure tubular elements in sealed relationship, which can release in response to an axial loading in excess of a predetermined amount, and which can at least partially accommodate internal pressure variations during use.

According to one embodiment of the invention, there is provided a high pressure coupling for releasably coupling high pressure tubular elements in sealed relationship, the coupling comprising:

a first tubular member having a socket formation;

a second tubular member having a spigot formation sealingly engaged with the socket formation in mating relationship therewith;

one member having an annular recess and the other member having a radially directed annular bearing surface to cooperate with a locking sleeve;

a radially deformable locking sleeve positioned in the annular recess, the locking sleeve being located against radial deformation out of the recess by the bearing surface engaging with a radially directed surface of the locking sleeve;

bias means operative between the tubular members to provide a predetermined bias force to restrain axial separation of the mated formations;

the tubular members being axially separable upon application of an axial separation force in excess of the predetermined bias force of the bias means for the bearing surface to disengage from the locking sleeve, and for the locking sleeve to be radially deformed out of the annular recess to release the member having the recess for the spigot formation to separate from the socket formation; and the tubular members being shaped to define an annular pressure balancing chamber which is in communication with the coupling bore and which is further defined by axially spaced radially extending pressure flanges which are associated with the members for pressure within the balancing chamber to act on the flanges for urging the members into mating engagement and at least partially balance the axial separation force generated by pressure in the coupling during use.

Because the coupling is designed for high pressure use, the locking sleeve is annular so that there will be line contact between the locking sleeve and the annular recess, and so that there will be line contact between the annular bearing surface and the annular locking sleeve, thereby preventing either plastic deformation of the locking sleeve or deformation of the locking sleeve into the member having the recess or into the bearing surface.

In preferred applications of the coupling of this invention, the coupling would be designed for use, inter alia, with 8", 12" and 20" diameter subsea pipeline systems.

Such systems would typically be operated with fluid pressures of between about 1400 and about 3000 lbs per square inch.

Where couplings are designed for use in fluid systems at pressures of say 1440 lbs per square inch, they would be hydrotested at a pressure of 2160 lbs per square inch, while for operation at 2160 lbs per square inch, they would require hydrotesting at a pressure of 3250 lbs per square inch.

On a 20" diameter system, at an internal pressure of 3250 lbs per square inch, the axial separation force which would be generated for urging coupling components apart during use, will be in excess of about 750,000 lbs.

It will be appreciated, thereto, that in high pressure systems, any release coupling which is unable to accommodate these axial separation forces will be totally unsuitable for use as a release coupling.

In typical subsea environments axial tension forces can be applied as a result of, for example, an anchor snagging such a pipeline system. To prevent damage to the system, it is essential that a release coupling should unlatch at a predetermined axial tension load, and should not release when axial loads below the predetermined amount are applied.

Typically, for a 20" pipeline system, the coupling should be such that it will release or unlatch at an axial tension load of say 1,000,000 lbs. For 12" and 8" pipeline systems, the coupling should release at axial tension loads of say about 300,000 lbs and about 100,000 lbs respectively.

For a coupling to be able to withstand such substantial axial tension loads, and yet yield consistently upon application of a predetermined load, it is essential that there should be no plastic deformation of any latching means employed, and essential that the latching means should not plastically deform into the components of the coupling which cooperate with the latching means.

Where there is, therefore, point contact between the latching means and the operative components of a coupling, plastic deformation will inevitably occur thereby resulting in premature unlatching and failure of a release coupling.

In a preferred embodiment of the invention, therefore, the annular recess may be in the form of an annular groove shaped to define an annular abutment surface directed at an acute angle to the axis of the member, and the locking sleeve may have a complementary annular abutment surface to provide annular surface contact between the locking sleeve and the groove.

While the annular groove may be provided on the spigot or within the socket formation, it is preferably provided in the outer surface of the spigot formation, with the bearing surface provided on an inner annular surface of the socket formation.

The bias means may conveniently be axially located in the coupling between an annular shoulder of the socket formation and the locking sleeve to bias the locking sleeve and thus the abutment surface of the locking sleeve into engagement with the abutment surface of the groove, thereby axially locating the bias means relatively to the spigot formation.

Since frictional resistance between the annular bearing surface and the surface of the locking sleeve engaged thereby, can affect the response of the coupling to axial tension loading, these surfaces may conveniently be shaped to minimize frictional resistance to relative axial displacement.

The coupling may conveniently include adjustment means to provide for predetermined pre-loading of the bias means.

By pre-loading the bias means, the bias rate can be checked to ensure that the bias means will operate as required under load, to adjust the coupling for the predetermined axial load at which the coupling is to uncouple, and, in particular, to isolate the coupling from any cyclic axial loads which are imposed on the coupling below the uncoupling load.

Pre-loading of the bias means can therefore provide the particular advantage that the spigot and socket formations will not be subjected to relative axial displacement under axial tension loads below the load at which the coupling is designed to automatically uncouple, thereby minimizing wear on cooperating surfaces during use. In addition, by preventing relative cyclic movement during use, not only will fatigue in the bias means be reduced, but fatigue and wear in the pressure seals employed in the coupling will be reduced thereby permitting the seals to perform better over an extended period.

In a specific embodiment of the invention, the adjustment means may be provided by the socket formation comprising an axially extending socket sleeve displaceably located on a radially extending flange, with the sleeve being axially adjustable relatively to the flange for pre-loading of the bias means.

In a preferred embodiment of the invention, the locking sleeve may comprise a base sleeve which is slidable on the spigot formation, and a plurality of of circumferentially spaced locking finger which extend integrally from the base sleeve in an axial direction, which are engaged with the annular recess, and which are radially deformable to release from the annular recess. The locking fingers may preferably be marginally spaced from each other to provide resistance against axial compression of the locking sleeve during use, and to provide substantial annular surface contact between the locking fingers and the annular recess, while permitting radial deformation of the locking fingers to release from the annular recess.

The locking sleeve may, for example, be formed by selecting or forming a tubular sleeve, and cutting slits in the sleeve at circumferentially spaced intervals which extend from one end of the sleeve towards the opposed end to define the locking fingers between the slits, and to define the base sleeve thereof between the inner ends of the slits and the adjacent end of the tubular sleeve.

This provides the advantage that it facilitates manufacture of the locking sleeve, that the locking sleeve can be made out of a material adequate to resist axial compression and yet permit radial expansion of the locking fingers, and that the locking fingers will be held in their correct position by the base sleeve thereby facilitating insertion and location of the locking sleeve in its operative position.

In a specific embodiment of the invention, the pressure balancing chamber may be defined in an annular chamber between the mated formations. In this embodiment one pressure flange may extend radially inwardly from the socket formation and engage sealingly with the spigot formation, and the remaining pressure flange may be defined by an annular piston located in the between the chamber to define the pressure balancing chamber between the annular piston and the first pressure flange, with the piston being engaged with the spigot formation by bearing axially against the locking sleeve during use.

While the bias means may be bias means of any type known to those skilled in the art, the bias means is preferably in the form of a belleville spring.

In a preferred embodiment of the invention, the belleville spring is located within the annular chamber between the annular piston and the locking sleeve, with the piston, during use, bearing axially against the belleville spring, for the belleville spring in turn to bear axially against the locking sleeve.

A belleville spring provides the advantage of giving high loads with little deformation. It provides the further advantage that by proper design of the initial angle of the belleville spring and/or the thickness thereof, a required design loading can be provided.

A belleville spring can provide the further advantage that the spring can be designed so that once the spring has been pre-loaded in the coupling of this invention, it will provide a specific required bias force so that the axial separation force at which the coupling will uncouple, can be accurately designed for. In addition, the belleville spring can be designed to provide a substantially linear or constant load response between its pre-loaded condition and its yield condition.

The invention further extends to a high pressure coupling for releasably coupling high pressure tubular elements in sealed relationship, the coupling comprising:

a first tubular member having a socket formation;

a second tubular member having a spigot formation sealingly engaged with the socket formation in mating relationship therewith;

locking means engaged with an annular recess in one member, and maintained in engagement with the recess by a bearing surface of the other member;

bias means axially located on the members to provide a bias force to restrain axial separation of the mated formations;

one of the members having an abutment shoulder against which the bias means is axially located relatively to that member, the position of the abutment shoulder being axially adjustable to provide for pre-loading of the bias means to provide a predetermined bias force to combat relative axial movement of the mated formations under axial tension loads below the bias force of the bias means;

the tubular members being axially separable upon application of an axial separation force in excess of the bias force of the bias means to disengage the bearing surface from the locking means, and to release the locking means from the annular recess for the spigot formation to separate from the socket formation; and the tubular members being shaped to define an annular pressure balancing chamber which is in communication with the coupling bore and which is further defined by axially spaced radially extending pressure flanges which are associated with the members for pressure within the balancing chamber to act on the flanges for urging the members into mating engagement and at least partially balance the axial separation force generated by pressure in the coupling during use.

The socket formation may conveniently comprise an axially extending socket sleeve which defines the socket formation, with the abutment shoulder comprising an annular abutment shoulder provided along an inner wall of the socket sleeve, with the socket sleeve being axially adjustable relative to the tubular member which it forms part of, to adjust the position of the abutment shoulder for pre-loading of the bias means.

The tubular members of this invention may be connected to tubular elements such as for example pipeline sections, by any conventional method known to those skilled in the art.

Thus, for example, the tubular members may be connected to tubular elements by welding, by bolting by means of radially extending bolting flanges, or the like.

Embodiments of the invention are now described by way of example with reference to the accompanying drawings.

In the Drawings

FIG. 2 shows a fragmentary perspective view of the locking sleeve of FIG. 1 in its locking condition;

Figure 1:
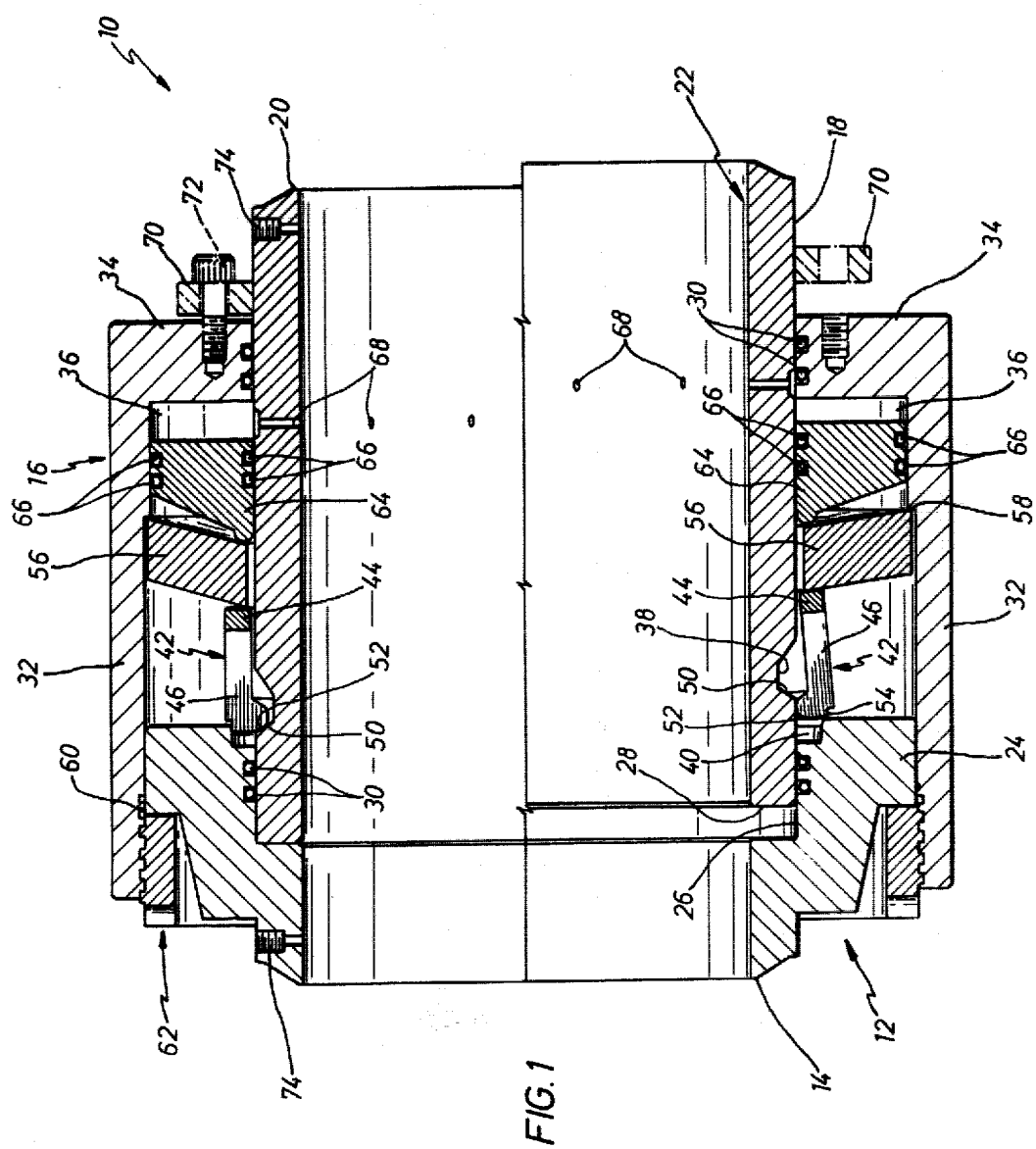
FIG. 1 shows a sectional side elevation of one embodiment of a coupling in accordance with this invention, with the upper portion of the drawing showing the coupling in its locked condition, and the lower half of the drawing showing the coupling in its unlocked condition.

With reference to FIGS. 1 and 2 of the drawings, reference 10 refers generally to high pressure coupling for releasably coupling high pressure tubular elements in the form of 20" diameter subsea pipeline sections, in sealed relationship.

The coupling 10 is designed for use in a subsea pipeline where oil or gas is to be conveyed at a pressure of about 2160 lbs per square inch.

The coupling 10 comprises a first tubular member 12 having a trailing end 14 for connection to a first high pressure pipeline section, and having a socket formation 16 at its leading end, and a second tubular member 18 having a trailing end 20 for connection to a second high pressure pipeline section, the member 18 having a spigot formation 22 sealingly engaged with the socket formation 16 in mating relationship.

The first tubular member 12 comprises a radially extending trailing flange 24 which defines a sealing bore 26 in which the leading end 28 of the spigot formation 22 is sealingly located.

The sealing bore 26 includes a pair of seals 30 which engage sealingly with the leading end 28.

The first tubular member 12 further comprises a socket sleeve 32 which extends axially from the trailing flange 24 to define the socket formation 16, the socket sleeve 32 having a leading flange 34 integrally welded thereto to extend radially inwardly from its leading end to engage sealingly with the spigot formation 22 for defining an annular pressure balancing chamber 36 at one end of an annular chamber between the mated socket and spigot formations 16 and 22.

The leading flange 34 includes a pair of seals 30 for the leading flange 34 to cooperate sealingly with the outer surface of the spigot formation 22.

The spigot formation has an annular recess 38 positioned proximate the trailing flange 24, while the trailing flange 24 has an annular radially directed bearing surface 40.

The coupling 10 includes locking means in the form of a locking sleeve 42.

The locking sleeve 42 is illustrated particularly in FIG. 2 of the drawings, and comprises a base sleeve 44 which is slidable on the spigot formation 22, and a plurality of circumferentially spaced locking fingers 46 which extend integrally from the base sleeve 44 in an axial direction, which are engaged with the annular recess 38 in the mated condition of the coupling 10, and which are radially deformable to release from the annular recess 38.

The locking sleeve 42 is formed by machining a tubular sleeve to provide an appropriate configuration, and then cutting the sleeve at circumferentially spaced intervals to form axially extending slits 48 which extend from the free end of the sleeve towards the base sleeve 44.

The slits 48 are sufficiently narrow and are spaced from each other sufficiently to permit radial deformation of the locking fingers 46 for uncoupling of the coupling 10 during use, but to preserve sufficient axial strength for the locking sleeve 42 to prevent axial compression of the locking sleeve 42 during use.

The locking sleeve 42 may conveniently be formed out of a high strength alloy steel, such as AISI 4130 or 4140. This is a conventional chrome-molybdenum alloy steel which can provide yield strengths far in excess of about 100,000 lbs per square inch.

By appropriate selection of material and wall thickness of the locking sleeve 42, the locking sleeve 42 can be designed so that the locking fingers 46 will be radially deformable as required for effective operation, while preventing any axial compression of the locking sleeve 42.

As will be apparent from the description below, any axial compression of the locking sleeve 42 can seriously affect the operation of the coupling 10 and, in particular, can make it impossible to design the coupling 10 so that it will uncouple or release at a specified predetermined axial separation force.

The locking sleeve 42 provides the further advantage that it can be manufactured in a simple and effective manner, and that the locking fingers 46 are held in their proper relationship and orientation by the base sleeve 44 for fitting of the locking sleeve 42 and during assembly of the coupling 10.

Further, even after radial displacement of the locking fingers 46 and uncoupling of the coupling 10, the locking sleeve 42 will be retained in the socket formation 16 and can be recovered for re-use.

The annular recess 38 is in the form of an annular groove which is shaped to define an annular abutment surface 50 which is planar and which is directed at an acute angle to the axis of the spigot formation 22 towards the trailing end 20 of the spigot formation 22.

The locking fingers 46 of the locking sleeve 42 are provided with curved complementary surfaces 52 which together provide an annular complementary mating surface for mating with the annular abutment surface 50 to locate the locking sleeve 42 axially on the spigot formation 22, and to provide annular surface contact between the locking sleeve 42 and the annular abutment surface 50 of the annular recess 38.

This is of particular importance in the high pressure couplings in accordance with this invention since such annular surface contact between the locking fingers 46 and the annular abutment surface 50 will combat plastic non-elastic deformation of the locking fingers 46 into the walls defining the annular recess 38 under the high axial loads for which the coupling 10 is designed.

In the absence of such annular surface contact between the locking sleeve 42 and the abutment surface 50, such as where, for example, there is only point contact at spaced intervals along the abutment surface 50, non-elastic plastic deformation of the abutment surface 50 will occur, leading to increased resistance to radial displacement of the locking fingers 46 when required, and leading to axial displacement of the locking sleeve 42 relatively to the spigot formation 22 while the coupling is in use.

Such relative axial movement will, as is hereinafter described, affect the pre-loading of the bias means and thus the reliability of the coupling to uncouple at a predetermined axial separation force.

In the coupled condition of the coupling, as hereinbefore described, the locking fingers 46 are engaged with the annular recess 38. The annular bearing surface 40 cooperates with complementary engagement surfaces 54 on the locking fingers 46 to locate the locking fingers 46 against radial deformation out of the annular recess 38.

The engagement surfaces 54 of the locking fingers 46 therefore provide an annular substantially continuous engagement surface which engages with the annular bearing surface 40.

Again, therefore, surface contact is provided to combat plastic deformation of the locking fingers 46 into the annular bearing surface 40. Again, therefore, any displacement of the locking fingers 46 in the coupled condition of the coupling 10, will be prevented, thereby preventing any relative axial movement between the locking sleeve 42 and the spigot formation 22 when the coupling 10 is in use.

The coupling 10 further includes bias means in the form of a belleville spring 56 which is operative between the socket formation 16 and the locking sleeve 42 to provide a predetermined bias force between the socket formation and the locking sleeve 42, and thus between the socket formation 16 and the spigot formation 22 to restrain axial separation of the formations during use of the coupling 10.

The socket sleeve 32 includes an annular abutment surface 58 which engages with an annular outer peripheral zone on one side of the belleville spring 56 to locate the belleville spring 56 axially relatively to the socket sleeve 32.

An inner annular peripheral zone of the belleville spring 56 on the opposed side, engages with the base sleeve 44 of the locking sleeve 42 to locate the belleville spring 56 axially relatively to the spigot formation 22 when the locking sleeve 42 is engaged with the annular recess 38, and the locking fingers 46 are maintained in their engaged condition by the annular bearing surface 40 engaging with the engagement surfaces 54.

The engagement surfaces 54 and the annular bearing surface 40 are designed to minimize frictional resistance between them.

Typically, these surfaces can be directed at an appropriate angle so that the frictional resistance to separation, which can affect axial separation characteristics, will be minor during relative axial displacement when the coupling 10 commences to release, thereby ensuring that such frictional resistance will not significantly influence uncoupling of the coupling at the predetermined separation force at which it is designed to uncouple automatically.

The belleville spring 56 has a radial dimension which is less than the radial dimension of the annular chamber between the socket sleeve 32 and the spigot formation 22 in which the belleville spring 56 is positioned, to avoid any radial restraint against deflection of the belleville spring 56 during use.

The belleville spring may be made of any conventional material known to those skilled in the art. Thus, for example, it may preferably be made out of a high strength chrome molybdenum alloy steel having a strength greater than about 200,000 lbs per square inch yield.

The bias force to be provided by the belleville spring 56, and the deflection characteristics of the belleville spring 56 can be designed for by appropriate selection of the materials of manufacture, by manufacturing the belleville spring 56 with an appropriate radial and axial dimension, and by manufacturing the belleville spring 56 with an appropriate initial angle to its axis.

In a preferred embodiment of the invention, the belleville spring 56 would be designed, in accordance with conventional technology, to provide a substantially linear load response or to provide a limited change in load during its final deflection stage.

The socket sleeve 32 is axially displaceable relatively to the trailing flange 24, and has an internally threaded portion 60 at its trailing end.

The coupling 10 further includes an externally threaded adjustment ring 62 to cooperate with the threaded portion 60 of the socket sleeve 32.

In use, therefore, by means of the adjustment ring 62, the socket sleeve 32 can be located axially relative to the trailing flange 24 thereby permitting pre-loading of the belleville spring 56.

Upon assembly of the coupling 10, the coupling can be loaded hydraulically to pre-load the belleville spring to a predetermined degree for providing a specific predetermined bias force by the spring 56, whereafter the adjustment ring 62 can be tightened to locate the socket sleeve 32 accurately on the trailing flange 24 and thereby fix the bellville spring 56 accurately in its pre-loaded condition.

Pre-loading of the belleville spring 56 provides a number of important advantages for the coupling of this invention.

By pre-loading the belleville spring 56, the spring rate of the spring 56 can be checked under load to ensure that it is operating properly under the loads for which it is designed.

In addition, by pre-loading the spring 56, the spigot formation 22 will be axially located relatively to the socket formation 16 thereby preventing any relative axial displacement of the spigot and socket formations 22 and 16 under the influence of any axial loads on the coupling 10 which are below the bias force provided by the spring 56, and therefore below the axial separation force at which the coupling 10 is designed to uncouple.

This provides not only the advantage of permitting the coupling to be designed accurately for uncoupling at a predetermined axial separation load, but facilitates the design of the spring 56 to provide a substantially straight load or constant response or limited additional load with additional deflection between the pre-loaded bias force, and the force required to deflect the spring 56 for separation of the mated spigot and socket formations 22 and 16.

In addition, by preventing any cyclic relative axial movement of the spigot and socket formations 22 and 16 during use, spring fatigue will be reduced. In addition, frictional wear between the frictionally engaged surfaces will be reduced if not eliminated entirely. In addition, by preventing relative displacement the seals 30 will perform better and will last longer.

The coupling 10 further includes an annular piston 64 which is displaceably located in the annular chamber to define one annular radial wall of the pressure balancing chamber 36.

The annular piston 64 has seals 66 which engage sealingly with the internal walls defining the socket sleeve 32 and with the external walls of the spigot formation 22.

The coupling 10 further includes circumferentially spaced ports 68 which place the bore of the spigot formation 22 in communication with the pressure balancing chamber 36.

In use, pressure within the pipeline system and therefore within the bore of the coupling 10, will produce an axial separation force which will tend to separate the mated socket and spigot formations 16 and 22. The radial dimensions of the leading flange 34 and the annular piston 64 are therefore designed so that the corresponding internal pressure within the annular pressure balancing chamber 36 will provide a balancing force against the leading flange 34 on one side, and against the annular piston 64 on the opposed side, to draw the socket and spigot formation 16 and 22 towards each other.

By appropriate design of the pressure balancing chamber, the axial separation force generated by internal pressure within the coupling can be balanced by the internal pressure within the pressure balancing chamber 36 so that the coupling 10 will be unaffected by the internal pressure prevailing therein.

It will be noted that the annular piston 64 bears against an inner annular peripheral zone of the belleville spring 56, on the opposed side of the annular surface of the belleville spring 56 which bears against the base sleeve 44, thereby locating the annular piston axially relatively to the spigot formation 22.

Unless a pressure balancing chamber is employed to balance the internal pressure tending to separate the socket and spigot formation 16 and 22, the coupling 10 cannot be designed so that it will release at a specific predetermined axial separation force regardless of the prevailing internal pressure.

The coupling 10 further includes overload protection means in the form of an annular protection flange 70 which is fixed to the spigot formation 22 by welding. Bolts 72 extend through the protection flange 70 and engage with the leading flange 34.

Once the coupling 10 has been assembled and has been pre-loaded as required, the bolts 72 are engaged with the leading flange 34 to fix the socket formation 16 relatively to the spigot formation 22 during storage and handling of the coupling 10 to protect the coupling against overload.

When the coupling is ready for use, the bolts 72 are removed to release the socket formation 16 from the spigot formation 22.

The coupling 10 further includes pressure sensing ports 74 at its opposed ends. In use, a pressure sensing valve and conduit will be mounted in the upstream pressure port 74 for sensing a pressure drop in the coupling 10 when it uncouples, to thereby trigger an upstream fluid flow cutoff valve to automatically cut off fluid flow when the coupling 10 uncouples.

The specific cutoff system employed may be of any conventional type known to those skilled in the art.

The sensing ports are provided at both ends of the coupling 10 so that either end may be used as the upstream end.

In use, a conventional one-way valve may be provided at the downstream end to close the downstream end when the coupling 10 uncouples during use.

Figure 3:
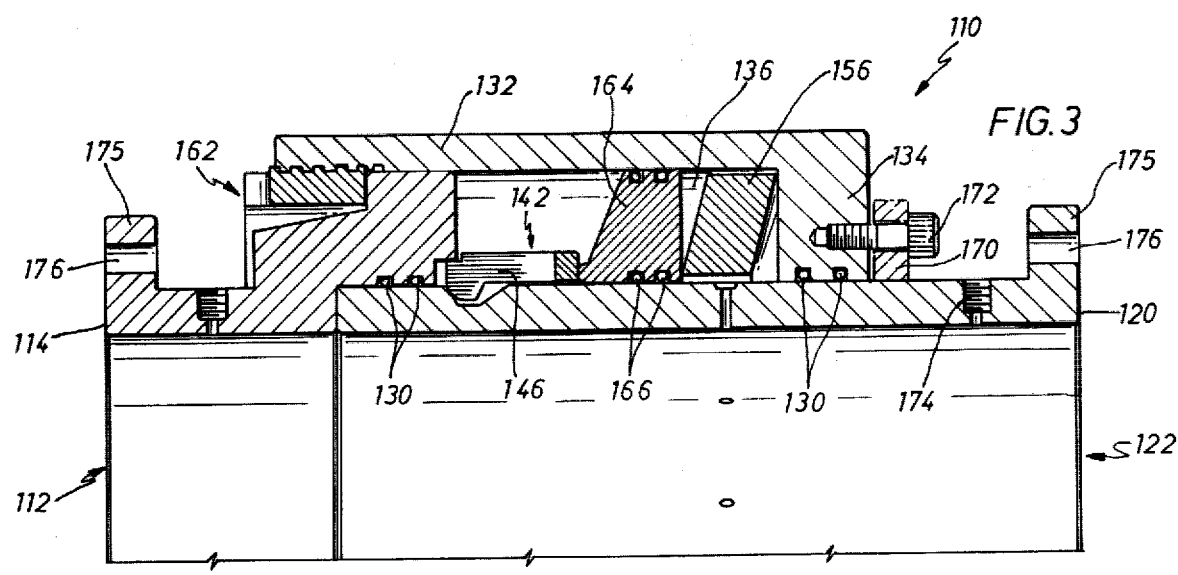
FIG. 3 shows a fragmentary sectional side elevation of an alternative embodiment of the coupling of FIG. 1, in its locked condition.

The trailing ends 14 and 20 of the socket formation 16 and the spigot formation 22 may be connected to high pressure pipeline sections by, for example, welding. Alternatively, if desired, as illustrated in FIG. 3 of the drawings, radial connection flanges may be provided at the trailing ends for bolting the triling ends to pipe sections.

It will be appreciated that any other conventional means may be employed to connect the trailing ends 14 and 20 to pipe sections or to the ends of other tubular elements.

In use, where the coupling 10 is designed for use with 20" diameter subsea pipeline sections, the coupling 10 would be designed to, for example, uncouple automatically at an axial separation force of say 1,000,000 lbs.

The belleville spring 56 would therefore be designed to provide a bias force marginally below 1,000,000 lbs, while the locking sleeve 42 would be designed to provide no axial compression whatsoever at such an axial loading.

Because the pressure balancing chamber 36 is designed to provide a balancing force urging the socket and spigot formations 16 and 22 into mating engagement against the separation force generated within the coupling 10 by internal pressure, the coupling 10 can be designed to uncouple at the predetermined axial separation force regardless of the internal pressure prevailing therein at the time of separation.

When an axial separation force is applied to the coupling at the designed level of say 1,000,000 lbs, the spring 56 will deflect to permit limited axial separation of the spigot formation 22 and the socket formation 16 until the engagement surfaces 54 of the locking fingers 46 release from the annular bearing surface 40.

As soon as the locking fingers 46 are released, the mating surfaces 52 of the locking fingers 46 will be displaced along the annular abutment surface 50 to cause radial deformation of the locking fingers 46 out of the annular recess 38.

As soon as the locking fingers 46 have been disengaged from the annular recess 38, the spigot formation 22 is freed for axial separation from the socket formation 16 to permit total uncoupling.

The spigot formation 22 can therefore withdraw from the socket formation 16, leaving the locking sleeve 42, the spring 56 and the annular piston 64 within the socket formation 16.

The coupling 10 therefore provides the advantage that by having the annular piston 64 and the belleville spring 56 bearing axially against the locking sleeve 42, which is specifically designed to resist any axial compression, the belleville spring 56 and annular piston 64 are axially located relatively to the spigot formation 22 by the locking sleeve 42 engaging in the annular recess 38. However, once the locking sleeve 42 has been released from the annular recess 38, the spigot formation 22 is freely displaceable relatively to the spring 56 and the annular piston 64 to permit complete withdrawal of the spigot formation 22 from the socket formation 16 and therefore total uncoupling of the coupling 10.

The embodiment of the invention as illustrated in FIGS. 1 and 2 of the drawings, therefore provides the advantage that both the belleville spring 16 and the annular piston 64 are positively and effectively located axially relatively to the spigot formation for effective operation of the coupling 10 while, once the predetermined axial tension load has been exceeded, they are released from the spigot formation 22 to permit the required complete withdrawal thereof from the socket formation 16.

The seals 30 may be of any suitable material known to those skilled in the art, which is capable of providing an effective seal at the pressures for which the coupling 10 is designed.

In a preferred embodiment of the invention, the seals 30 and 66 will be seals of the elastomer type. Seals of this type are commercially available as heavy section fluoro carbon elastomer seals, and are typically available commercially as Parker Polypak seals and Sacomo O U seals.

Because of the pre-loading of the belleville spring 56 relative axial displacement of the socket and spigot formations 16 and 22 at loads below the predetermined axial separation load will be prevented, thereby ensuring that the seals 30 and 66 are not subjected to frictional or deflectional forces while the coupling 10 is in its operative condition. This will ensure that the seals will maintain an effective sealing engagement for an extended period and will perform effectively. In addition, once the coupling has been assembled and once the belleville spring 56 has been pre-loaded, it can be tested under maximum design conditions. If the seals perform perfectly at such conditions, this will be a guarantee that the seals will perform perfectly during use until the coupling 10 is subjected to axial tension loads in excess of the predetermined amount, and the coupling 10 releases automatically.

The coupling 10 may be made out of any suitable material for the loads which it is designed to withstand. Conveniently, for example, the coupling 10 may be made out of mild steel.

The specific design of the coupling 10 provides the advantage that the socket sleeve 32, the adjustment ring 62, the annular piston 64 and the spigot formation 22 are all tubular. Even for small scale production runs, therefore, these elements can all be formed by conventional means and finished with a limited degree of machining.

In addition, the leading flange 34 can be machined out of mild steel plate and welded in position at the leading end of the socket sleeve 32. Similarly, the protection flange 70 can be formed out of mild steel plate and welded in position on the spigot formation 22.

While the remainder of the socket formation 16, namely the trailing flange 24 and the trailing end 14 which extends therefrom, is also generally tubular, more machining would be required to complete that portion.

The ease of manufacture is a particular advantage when the couplings are to be made for large bore high pressure use where conventional forming techniques such as casting or stamping would not provide components of sufficient strength.

With references to FIG. 3 of the drawings, reference 110 refers generally to an alternative embodiment of a coupling in accordance with this invention.

The coupling 110 corresponds substantially with the coupling 10 of FIG. 1, and corresponding parts have been indicated by corresponding reference numerals with the prefix "1".

In the coupling 110, the relative positions of the belleville spring 156 and annular piston 164 have been reversed. The belleville spring 156 is therefore positioned in the pressure balancing chamber 136 to bear against the annular piston 164 along its inner peripheral edge, and to bear against the leading flange 134 along its opposed outer peripheral edge.

The coupling 110 further differs from the coupling 10 in that radially extending securing flanges 175 are provided at the trailing end 120 of the spigot formation 122 and the trailing end 114 of the first tubular member 112, with the flanges having bolt holes 176 for bolting the flanges onto corresponding flanges provided at the ends of tubular elements or pipe sections to be secured to the coupling 110.

Figure 4:
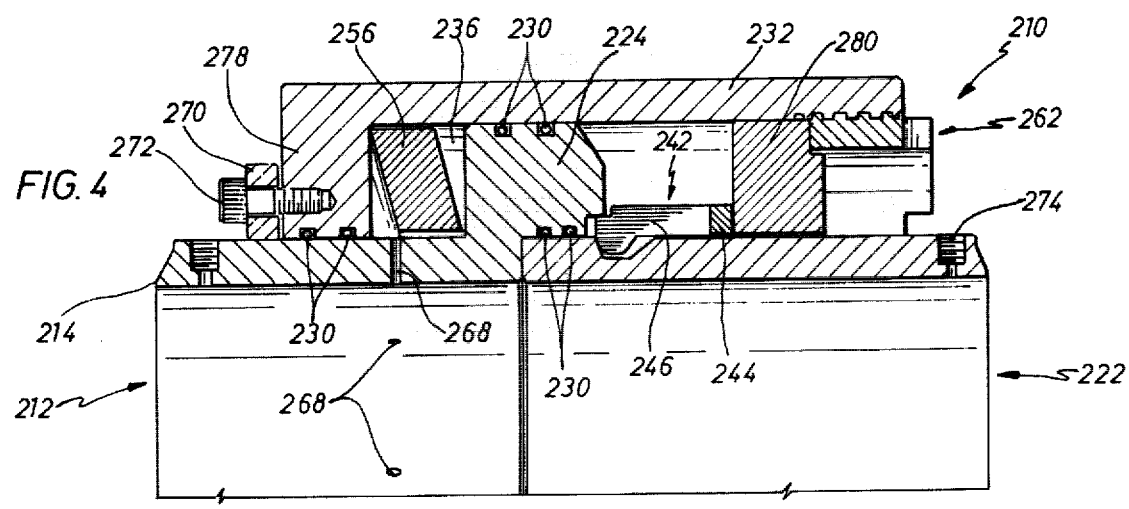
FIGS. 4 and 5 show fragmentary, sectional side elevations of alternative embodiments of the coupling of this invention in its locked condition.

With reference to FIG. 4 of the drawings, reference 210 refers to yet a further alternative embodiment of a release coupling in accordance with this invention.

The coupling 210 corresponds generally with the coupling 10 as illustrated in FIG. 1. Corresponding parts are indicated by corresponding reference numerals to those used in FIG. 1, except the prefix "2" has been employed.

In the coupling 210, the first tubular member 212 has a trailing end 214 extending in a trailing direction from a trailing flange 224.

The coupling 210 has a socket sleeve 232 which has a radially extending trailing flange 278 at its trailing end.

At its leading end the socket sleeve 232 has a displaceable annular flange 280 which is located axially relatively to the socket sleeve 232 by means of a threaded adjustment ring 262.

An annular pressure balancing chamber 236 is defined between the trailing flange 224 and the trailing flange 278, with ports 268 being provided through the walls of the first tubular member 212 to place the pressure balancing chamber 236 in communication with internal pressure within the coupling 210 during use.

The belleville spring 256 is positioned within the pressure balancing chamber 236 to abut the trailing flange 278 on one side and the trailing flange 224 on the opposed side.

The spring 256 axially locates the spigot formation 222 relatively to the first tubular member 212 by acting on the trailing flange 278 through the socket sleeve 232, the flange 280 and the locking sleeve 242.

The coupling 210 further differs from the coupling 10 in that it has a protection flange 270 mounted on the first tubular member 212 and not on the spigot formation 222.

The pressure balancing chamber 236 is sealed by means of seals 230.

The coupling 210 functions in the same way as the coupling 10, is pre-loaded by hydraulically compressing the spring 256 and then tightening the adjustment ring 262, and releases upon radial deformation of the locking fingers of the locking sleeve 242 to permit complete withdrawal of the spigot formation 222.

The coupling 210 is of simpler construction in that it dispenses with the separate annular piston 64 of the coupling 10, but requires the additional flange 280.

Figure 5:
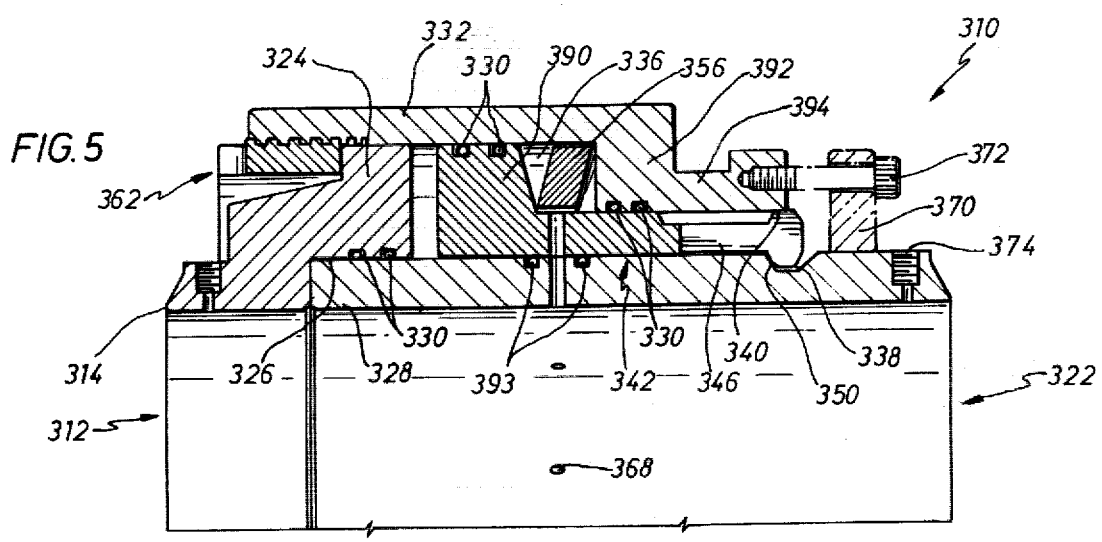

With reference to FIG. 5 of the drawings, reference 310 refers generally to a further alternative embodiment of a release coupling in accordance with this invention.

The coupling 310 corresponds generally with the couplings 10 and 210. Corresponding portions are therefore indicated by corresponding reference numerals except that the prefix "3" has been employed.

In the coupling 310 the spigot formation 322 has an annular recess 338 which is spaced from the leading and 328 of the spigot formation.

The coupling 310 has a locking sleeve 342 with deformable locking fingers 346 which are engaged with the recess 338.

The locking sleeve 342 has a radial flange 390 which extends radially outwardly, at its end.

The coupling 310 has a first tubular member 312 with a trailing flange 324 and with a socket sleeve 332 adjustably extending therefrom.

The socket sleeve 332 has a stepping flange 392 which extends radially inwardly and engages sealing with the locking sleeve 342 via seals 330.

A pressure balancing chamber 336 is defined between the radial flange 390 and the stepping flange 392.

A belleville spring 356 is located in the chamber 336, and the chamber 336 is placed in communication with the bore of the coupling 310 by means of ports 368.

The locking sleeve 342 is sealing engaged with the spigot formation 322 by means of seals 393. The spigot formation 322 engages sealing in a sealing bore 326 provided in the trailing flange 324, via seals 330.

The stepping flange 392 has a tubular portion 394 extending therefrom. The tubular portion 394 defines an annular bearing surface 340 which engages radially with the locking finger 346 to maintain them in engagement with the annular recess 338.

The coupling 310 includes a protection flange 370 which is mounted on the spigot formation 322, and which is bolted to the tubular portion 394 by means of bolts 372 prior to use of the coupling 310 to protect the coupling against overload. The bolts 372 are removed for use.

The socket sleeve 332 is axially displaceable relatively to the trailing flange 324 for pre-loading of the spring 356. After pre-loading, it is located by means of an annular threaded adjustment ring 362 which engages with the socket sleeve 332.

The operation of the coupling is similar to that of the prior couplings illustrated in the drawings, in that upon application of an axial separation force in excess of the predetermined bias force of the spring 356, the spigot formation 322 will be displaced axially relatively to the socket sleeve 332 against the action of the bias spring 356 to release the annular bearing surface 340 from the locking fingers 346.

The locking fingers 346 will then be deformed radially out of engagement with the recess 338 to release the spigot formation 322 and allow complete withdrawal thereof.

It is particularly important that, to protect the system effectively against damage, the spigot formation must release completely from the socket formation. By axially locating the bias means through an axially located locking sleeve, this objective is achieved in a particularly effective manner which avoids the use of abutment shoulders or the like which can interfere with such withdrawal.

What is claimed is:

1. A high pressure coupling for releasably coupling high pressure tubular elements in sealed relationship, the coupling comprising:

a first tubular member having a socket formation;

a second tubular member having a spigot formation to be sealingly engaged with the socket formation in mating relationship therewith;

one member having an annular recess and the other member having a radially directed annular bearing surface to cooperate with a locking sleeve, the annular recess being shaped to define an annular abutment surface;

a radially deformable locking sleeve having a complementary annular abutment surface, the locking sleeve being adapted to be located with its complementary annular abutment surface in abutment with the annular abutment surface in the annular recess, and the locking sleeve being adapted to be located against radial deformation out of the recess by the bearing surface engaging with a radially directed surface of the locking sleeve during use;

bias means to be operative between the tubular members to bias the complementary abutment surface into engagement with the abutment surface to provide a predetermined bias force to restrain axial separation of the formations when mated;

the tubular members when mated being axially separable upon application of an axial separation force in excess of the predetermined bias force of the bias means for the bearing surface to disengage from the locking sleeve, and for the bias means to continue to bias the complementary abutment surface against the abutment surface to force the locking sleeve to become radially deformed out of the annular recess to release the member having the recess for the spigot formation to separate from the socket formation; and the tubular members being shaped to define, when mated, an annular pressure balancing chamber which is in communication with the coupling bore and which is further defined by axially spaced radially extending pressure flanges which are associated with the members for pressure within the balancing chamber to act on the flanges for urging the members into mating engagement and at least partially balance the axial separation force generated by pressure in the coupling during use.

2. A coupling according to claim 1, in which the annular recess is in the form of an annular groove shaped to define the annular abutment surface directed at an acute angle to the axis of the member, and in which the locking sleeve has the complementary annular abutment surface shaped to provide annular surface contact between the locking sleeve and the groove.

3. A coupling according to claim 2, in which the annular groove is provided in the outer surface of the spigot formation, in which the bearing surface is provided on an inner annular surface of the socket formation, and in which the annular abutment surface is directed in a direction away from the socket formation for cooperating with the complementary abutment surface of the locking sleeve for the bias means to force the surfaces to cooperate to radially deform the locking sleeve out of the annular groove when the bearing surface disengages from the locking sleeve upon relative axial displacement of the spigot formation and the locking sleeve during use.

4. A coupling according to claim 3, in which the annular bearing surface and the surface of the locking sleeve engaged thereby are shaped to minimize frictional resistance to relative axial displacement.

5. A coupling according to claim 1, in which one of the members is adjustable to provide for predetermined pre-loading of the bias means.

6. A coupling according to claim 5, in which the socket formation comprises an axially extending socket sleeve displaceably located on a radially extending flange, and in which the sleeve is axially adjustable relatively to the flange for pre-loading of the bias means.

7. A coupling according to claim 1, in which the locking sleeve comprises a base sleeve which is slidable on the spigot formation, and a plurality of circumferentially spaced locking fingers which extend integrally from the base sleeve in an axial direction, which are engaged with the annular recess, and which are radially deformable to release from the annular recess.

8. A coupling according to claim 7, in which adjacent locking fingers are marginally spaced from each other to provide resistance against axial compression of the locking sleeve while permitting radial deformation of the locking fingers.

9. A coupling according to claim 1, in which the pressure balancing chamber is defined in an annular chamber between the formations when mated, in which one pressure flange extends radially inwardly from the socket formation to engage sealingly with the spigot formation, in which the remaining pressure flange is defined by an annular piston located in the annular chamber, and in which the piston is axially located on the spigot formation during use through the axially located locking sleeve.

10. A coupling according to claim 9, in which the bias means is in the form of a belleville spring, in which the belleville spring is located within the pressure balancing chamber between the annular piston and the locking sleeve, and in which the piston, during use, bears axially against the belleville spring, which in turn bears axially against the locking sleeve.

11. A coupling according to claim 9, in which the bias means comprises a belleville spring which is positioned in the pressure balancing chamber and which is axially located between the socket formation and the annular piston.

12. A high pressure coupling for releasably coupling high pressure tubular elements in sealed relationship, the coupling comprising:
  a first tubular member having a socket formation defined by an axially extending socket sleeve;
  a second tubular member having a spigot formation sealingly engaged with the socket formation in mating relationship therewith;
  locking means engaged with an annular recess in the second tubular member, and maintained in engagement with the recess by a bearing surface of the first tubular member;
  bias means axially located on the socket formation to bias the locking means axially along the spigot formation in the direction of the inner end of the spigot formation into locking engagement with the recess to thereby provide a bias force to restrain axial separation of the mated formations;
  the socket sleeve having an abutment shoulder provided along its inner surface against which the bias means is axially located relatively to that member, the position of the abutment shoulder being axially adjustable to provide for pre-loading of the bias means to provide a predetermined bias force to combat relative axial movement of the mated formations under axial tension loads below the bias force of the bias means;
  the tubular members being axially separable upon application of an axial separation force in excess of the bias force of the bias means to disengage the bearing surface from the locking means, and to release the locking means from the annular recess for the spigot formation to separate from the socket formation; and
  the tubular members being shaped to define an annular pressure balancing chamber which is in communication with the coupling bore and which is further defined by axially spaced radially extending pressure flanges which are associated with the members for pressure within the balancing chamber to act on the flanges for urging the members into mating engagement and at least partially balance the axial separation force generated by pressure in the coupling during use.

13. A coupling according to claim 12, in which the abutment shoulder is axially adjustable by the socket sleeve being axially adjustable relatively to the tubular member which it forms part of, to adjust the position of the abutment shoulder for pre-loading of the bias means.

14. A high pressure coupling for releasably coupling high pressure tubular elements in sealed relationship, the coupling comprising:
  a first tubular member having a trailing end for connection to a first high pressure tubular element, and having a socket formation at its leading end;
  a second tubular member having a trailing end for connection to a second high pressure tubular element, the member having a spigot formation sealingly engaged with the socket formation in mating relationship;

the first tubular member comprising a trailing flange defining a sealing bore in which the leading end of the spigot formation is sealingly located, and a socket sleeve extending axially from the trailing flange to define the socket formation, the socket sleeve having a leading flange extending radially inwardly from its leading end to engage sealingly with the spigot formation for defining an annular pressure balancing chamber between the mated socket and spigot formations;

the spigot formation having an annular recess positioned proximate the trailing flange, and the trailing flange having an annular radially directed bearing surface;

locking means engaged with the annular recess and maintained in engagement therewith by the bearing surface engaging with the locking means;

bias means operative between the socket formation and the locking means to provide a predetermined bias force between the socket formation and the locking means, and thus between the socket formation and the spigot formation to restrain axial separation of the formations;

the tubular members being axially separable upon application of an axial separation force in excess of the bias force of the bias means to disengage the bearing surface from the locking means, and to release the locking means from the annular recess for the spigot formation to separate from the socket formation;

ports extending through the spigot formation to place the pressure balancing chamber in communication with the bore of the spigot formation; and an annular piston located in the pressure balancing chamber to abut the locking means, the radial dimensions of the piston and leading flange being such that internal pressure within the balancing chamber acting on the piston and leading flange during use can provide a balancing force to at least partially balance the force of internal pressure during use tending to separate the formations.

15. A coupling according to claim 14, in which the bias means comprises a belleville spring which is located between the locking means and the annular piston, for the piston to bear against the locking means through the belleville spring, the socket sleeve having an abutment shoulder which locates the belleville spring axially relatively to the socket sleeve.

16. A coupling according to claim 15, in which the socket sleeve includes adjustment means for axially adjusting the socket sleeve relatively to the trailing flange for pre-loading of the bias means to prevent relative movement of the spigot and socket formations under axial tension loads below the bias force of the bias means.

17. A coupling according to claim 14, including removable overload protection means for fixing the socket formation axially relatively to the spigot formation prior to use of the coupling.

18. A coupling according to claim 16, in which the belleville spring is designed to provide a substantially linear or constant load response between its pre-loaded condition and its yield condition where it releases the mated formations from each other.

19. A high pressure coupling for releasably coupling high pressure tubular elements in sealed relationship, the coupling comprising:

a first tubular member having a socket formation;

a second tubular member having a spigot formation sealingly engaged with the socket formation in mating relationship therewith;

one member having an annular recess and the other member having a radially directed annular bearing surface to cooperate with a locking sleeve;

a radially deformable locking sleeve positioned in the annular recess, the locking sleeve being located against radial deformation out of the recess by the bearing surface engaging with a radially directed surface of the locking sleeve;

bias means operative between the tubular members to provide a predetermined bias force to restrain axial separation of the mated formations;

the tubular members being axially separable upon application of an axial separation force in excess of the predetermined bias force of the bias means for the bearing surface to disengage from the locking sleeve, and for the locking sleeve to be radially deformed out of the annular recess to release the member having the recess for the spigot formation to separate from the socket formation;

the tubular members being shaped to define an annular pressure balancing chamber in an annular chamber between the mated formations which is in communication with the coupling bore and which is further defined by axially spaced radially extending pressure flanges which are associated with the members for pressure within the balancing chamber to act on the flanges for urging the members into mating engagement and at least partially balance the axial separation force generated by pressure in the coupling during use, the one pressure flange extending radially inwardly from the socket formation and engaging sealingly with the spigot formation, the remaining pressure flange being defined by an annular piston located in the annular chamber, and the piston being axially located on the spigot formation during use through the axially located locking sleeve; and the bias means comprising a belleville spring which is positioned in the pressure balancing chamber and which is axially located between the socket formation and the annular piston.

20. A high pressure coupling for releasably coupling high pressure tubular elements in sealed relationship, the coupling comprising:

a first tubular member having a socket formation;

a second tubular member having a spigot formation sealingly engaged with the socket formation in mating relationship therewith;

one member having an annular recess and the other member having a radially directed annular bearing surface to cooperate with a locking sleeve;

a radially deformable locking sleeve positioned in the annular recess, the locking sleeve being located against radial deformation out of the recess by the bearing surface engaging with a radially directed surface of the locking sleeve;

bias means operative between the tubular members to provide a predetermined bias force to restrain axial separation of the mated formations;

the tubular members being axially separable upon application of an axial separation force in excess of the predetermined bias force of the bias means for the bearing surface to disengage from the locking sleeve, and for the locking sleeve to be radially deformed out of the annular recess to release the member having the recess for the spigot formation to separate from the socket formation;

the tubular members being shaped to define an annular pressure balancing chamber in an annular chamber between the mated formations which is in communication with the coupling bore and which is further defined by axially spaced radially extending pressure flanges which are associated with the members for pressure within the balancing chamber to act on the flanges for urging the members into mating engagement and at least partially balance the axial separation force generated by pressure in the coupling during use, the one pressure flange extending radially inwardly from the socket formation and engaging sealingly with the spigot formation, the remaining pressure flange being defined by an annular piston located in the annular chamber, and the piston being axially located on the spigot formation during use through the axially located locking sleeve; and the bias means being in the form of a belleville spring which is positioned within the annular chamber between the annular piston and the locking sleeve, the belleville spring being axially located between the socket formation and the locking sleeve, and the piston, during use, bearing axially against the belleville spring, which in turn bears axially against the locking sleeve.

21. A high pressure coupling for releasably coupling high pressure tubular elements in sealed relationship, the coupling comprising:

a first tubular member having a socket formation;

a second tubular member having a spigot formation to be sealingly engaged with the socket formation in mating relationship therewith;

one member having an annular recess and the other member having a radially directed annular bearing surface to cooperate with a locking sleeve;

a radially deformable locking sleeve to be positioned in the annular recess to be located against radial deformation out of the recess by the bearing surface engaging with a radially directed surface of the locking sleeve during use;

bias means to be operative between the tubular members to provide a predetermined bias force to restrain axial separation of the mated formations;

the tubular members when mated being axially separable upon application of an axial separation force in excess of the predetermined bias force of the bias means for the bearing surface to disengage from the locking sleeve, and for the locking sleeve to be radially deformed out of the annular recess to release the member having the recess for the spigot formation to separate from the socket formation; and the tubular members being shaped to define an annular pressure balancing chamber in an annular chamber between the two members when mated, which is in communication with the coupling bore and which is further defined by axially spaced radially extending pressure flanges which are associated with the members when mated for pressure within the balancing chamber to act on the flanges for urging the members into mating engagement and at least partially balance the axial separation force generated by pressure in the coupling during use.

22. A coupling according to claim 21, in which the one pressure flange extends radially inwardly from the socket formation to engage sealingly with the spigot formation, and in which the remaining pressure flange is defined by an annular piston which is located in the annular chamber, the piston having sealing means along its outer annular periphery to engage sealingly with the inner surface of the socket formation, and having sealing means along its inner annular periphery to engage sealingly with the outer surfaces of the spigot formation.

23. A coupling according to claim 22, in which the bias means comprises annular bias means located in the annular chamber.

24. A coupling according to claim 23, in which the piston is slidably located in the annular chamber for axial displacement therein, and in which the piston, the bias means and the locking sleeve cooperate axially during use to locate the piston axially in the annular chamber.

25. A coupling according to claim 24, in which the bias means is located axially during use against an annular abutment shoulder along an inner surface of the annular chamber, and in which the piston is axially located during use between the bias means and the locking sleeve.

26. A coupling according to claim 24, in which the bias means is located axially during use against an annular shoulder along an inner surface of the annular chamber on the one side and against the locking sleeve on the other side, and in which the piston during use bears axially against the bias means.

27. A coupling according to claims 23, 24, 25 or 26, in which the bias means comprises a belleville spring.

28. A high pressure coupling for releasably coupling high pressure tubular elements in sealed relationship, the coupling comprising:

a first tubular member having a socket formation;

a second tubular member having a spigot formation to be sealingly engaged with the socket formation in mating relationship therewith;

one member having an annular recess and the other member having a radially directed annular bearing surface to cooperate with a locking sleeve;

a radially deformable locking sleeve to be positioned in the annular recess to be located against radial deformation out of the recess by the bearing surface engaging with a radially directed surface of the locking sleeve during use;

bias means to be operative between the tubular members to provide a predetermined bias force to restrain axial separation of the mated formations;

the tubular members when mated being axially separable upon application of an axial separation force in excess of the predetermined bias force of the bias means for the bearing surface to disengage from the locking sleeve, and for the locking sleeve to be radially deformed out of the annular recess to release the member having the recess for the spigot formation to separate from the socket formation; and the tubular members being shaped, when mated, to define an annular pressure balancing chamber which is in communication with the coupling bore, the pressure balancing chamber being further axially defined by a first pressure flange which is connected to the socket formation and extends radially inwardly and by a second pressure flange which is adapted to be axially located relatively to the spigot formation during use by means of the locking sleeve engaging with the annular recess for pressure within the balancing chamber to act on the flanges for urging the members into mating engagement and at least partially balance the axial separation force generated by pressure in the coupling during use, the axial location of the second pressure flange being adapted to be released during use when the locking sleeve disengages from the annular recess to allow the spigot formation to withdraw freely from the socket formation.

29. A coupling according to claim 28, in which the second pressure flange is adapted to be axially located on the spigot formation during use by axially abutting against the locking sleeve.

30. A coupling according to claim 29, in which the second pressure flange is adapted to axially abut against the locking sleeve during use by abutting axially against one side of the bias means while the opposed side of the bias means abuts axially against the locking sleeve.

* * * * *